June 30, 1964 G. E. FRANCK 3,139,293
TUBE FITTING HAVING MEANS TO INDICATE COMPLETE
ASSEMBLY POSITIONS
Filed Oct. 16, 1959
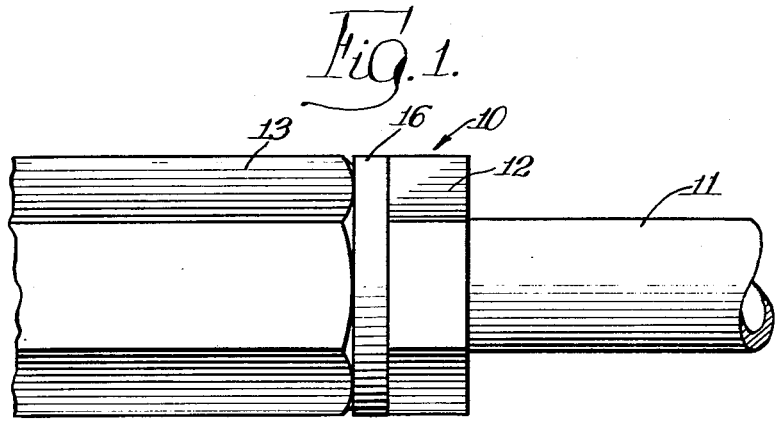
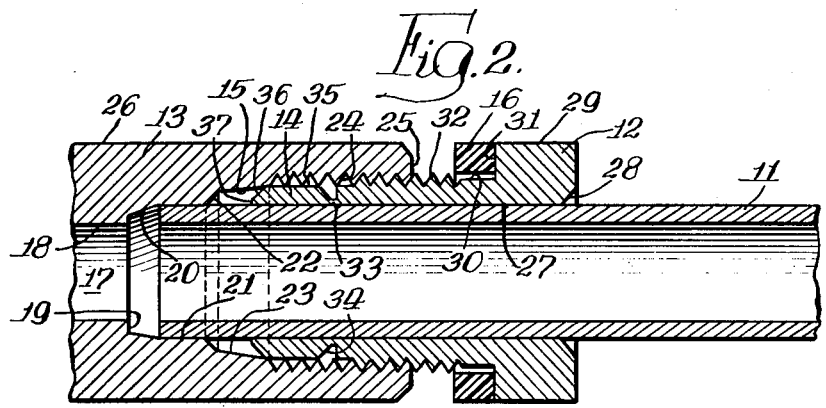
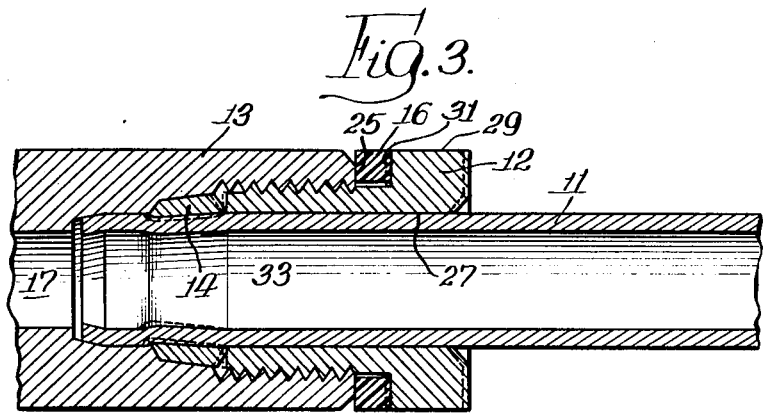
INVENTOR.
George E. Franck 3,139,293
Patented June 30, 1964

3,139,293
TUBE FITTING HAVING MEANS TO INDICATE
COMPLETE ASSEMBLY POSITIONS
George E. Franck, Riverside, Ill., assignor to Imperial-Eastman Corporation, a corporation of Illinois
Filed Oct. 16, 1959, Ser. No. 846,898
6 Claims. (Cl. 285—4)

This invention relates to tube fittings and in particular to tube fittings for use with tubing having any one of a plurality of different resistances to setting.

A well-known type of tube fitting is one having a nut provided with an inner nose portion deflectable, by engagement with a camming surface in the bore of the body to which the nut is secured, to engage constructively the end of the tubing and sealingly connect the tubing end to the body. In making up such a connection, it is desirable to provide some "hit home" indication of a proper completion of the connection so that over torqueing of the nut, resulting in excessive deformation of the nut nose, is avoided. A problem arises where such a fitting is to be used with different types of tubing having any one of a plurality of different resistances to setting, such as plastic tubing and copper tubing. Thus, while a substantial number of connections and disconnections of the fitting relative to set-resistant tubing, such as polyethylene tubing, may be effected with the fitting reconnected to the tubing in substantially the same arrangement each time, the fitting must be drawn more tightly upon each successive connection thereof with tubing formed of more settable material, such as copper. As a result, where the fitting is to be used selectively with tubing having such different resistances to setting, the conventional one position "hit home" indicating means of the art can not be used.

It is, therefore, a principal object of the instant invention to provide a new and improved fitting for use with tubing having any one of a plurality of different resistances to setting.

Another object is to provide such a fitting having new and improved means for indicating a "hit home" condition in any one of a plurality of different arrangements of the fitting members relative to each other corresponding to a plurality of conditions of set of the tubing.

A further object is to provide such a fitting wherein the "hit home" indicating means comprises a spacer extending between the nut and body and formed of a material having a limited yieldability, the extent of the spacer between the body and nut being such that when the body and nut are brought together to compress the spacer a preselected small amount less than that allowed by the limited yieldability of the spacer, a limited inward deflection of the deflectable portion of the nut results which is proper for effecting a sealing securing of the tubing to the body, and when, subsequent to such a bringing together of the body and nut, said body and nut are again brought together, substantially the same compression of the spacer may be effected to provide such inward deflection of the deflectable portion for effecting a sealing securing of the tubing to the body where the tubing has not been set as a result of the previously effected securing, and additional compression of the spacer may be effected up to the limit of its yieldability to provide such additional inward deflection of the deflectable portion proper for effecting a sealing securing of the tubing to the body where the tubing has taken a set as a result of the previously effected securing.

A still further feature of the invention is the provision of such a fitting wherein the spacer is formed of a plastic such as polyethylene.

Other features and advantages of the invention will be apparent from the following description taken in connection with the accompanying drawing wherein:

FIG. 1 is a fragmentary elevation of a fitting embodying the invention, with a portion of a tubing end secured thereto;

FIG. 2 is a diametric section thereof in a partially made-up condition; and

FIG. 3 is a diametric section thereof in the fully made-up condition, a subsequent arrangement of the fitting where the tubing has taken a set in a previous connection thereof being illustrated in dotted lines.

In the exemplary embodiment of the invention as disclosed in the drawing, a fitting generally designated 10 is provided for use with tubing 11 having any one of a plurality of different resistances to setting, such as plastic tubing and copper tubing. The fitting includes a nut member 12 arranged for association with a body member 13 which may comprise a unitary fitting element or may comprise a portion of an element, such as an instrument, (not shown) to which the tubing is to be connected. The nut member is provided with a deflectable inner nose portion 14 which is urged into constrictive engagement with the tubing by a cam surface 15 on the body member to seal the tubing to the body member upon completion of the connection. To indicate to the operator the completion of the connection and preclude excessive constrictive deflection of the nose portion 14, a "hit home" indicator is provided in the form of a spacer 16 extending between the body and the nut. As fitting 10 is adapted for use with tubing having any one of a plurality of different resistances to setting, spacer 16 is arranged to provide the "hit home" indication corresponding to a plurality of different conditions of set of the tubing.

More specifically, where the tubing is formed of a resilient material, such as a resilient plastic, the fitting may be remade a substantial number of times with the deflectable portion returning to substantially the same disposition each time. However, where the tubing is formed of a material, such as copper tubing, having a greater tendency to set, it is necessary to constrict the deflectable portion a slight additional amount each time the connection is remade. Whereas a rigid one position means for indicating the "hit home" condition may be employed where the fitting is used solely with non-setting tubing, the fact that the fitting must be tightened to a slightly greater degree upon each subsequent reconnection where the tubing is formed of a settable material requires a "hit home" indicating device that is operable in any one of a number of different positions corresponding to each of the plurality of conditions of set of the tubing. Spacer 16 provides this combined functioning in a new and improved, simple and economical manner.

Referring now more specifically to FIGS. 2 and 3, body member 13 comprises a rigid member having a through bore 17 including an inner portion 18 having a diameter substantially equal to the internal diameter of tubing 11, a radial shoulder 19 at the outer end of portion 18, a frusto-conical portion 20 widening outwardly from shoulder 19, a cylindrical portion 21 extending outwardly from frusto-conical portion 20 and having a diameter substantially equal to the outside diameter of tubing 11, a frusto-conical portion 22 widening outwardly from cylindrical portion 21 and defining the inner portion of cam surface 15, a frusto-conical portion 23 widening outwardly from frusto-conical portion 22 at an angle to the axis of bore 17 substantially less than the angle of frusto-conical portion 22 thereto and defining the outer portion of cam surface 15, and a cylindrical threaded portion 24 extending outwardly from portion 23 and opening through a radial end surface 25 of the body member. The radially outer surface 26 of the body member herein comprises a plurality of planar surfaces disposed hexagonally about the axis of the body member for facilitated tool engagement.

Nut member 12 comprises a rigid member having a cylindrical bore 27 completely therethrough opening into a frusto-conical guide surface 28 at the outer end. The outer end of the nut member is provided radially outwardly with a plurality of planar surfaces 29 arranged hexagonally about the axis of the nut member for facilitated tool engagement. Inwardly of surfaces 29, the nut member is reduced to define a cylindrical surface 30 and an annular radial shoulder 31 extending between surface 30 and surfaces 29. The diameter of surface 30 is slightly larger than the tooth-tip diameter of body threaded portion 24. Extending inwardly from cylindrical surface 30 is an exteriorly threaded portion 32 of the nut member arranged for co-operation with body threaded portion 24 to effect axial movement of nut member 12 upon rotation therebetween. Deflectable portion 14 comprises the innermost portion of nut member 12 and is secured to exteriorly threaded portion 32 by a frangible connection 33. Deflectable portion 14 is defined exteriorly by an outer frusto-conical portion 34 narrowing outwardly at a 45° angle to the axis of bore 27, a cylindrical mid-portion 35 having a diameter comparable to the tooth-tip diameter of body threaded portion 24, and an inwardly narrowing frusto-conical inner cam surface 36 narrowing inwardly at an angle of substantially 45° to the axis of bore 27. The inner tip of the deflectable portion 14 is defined by a radial annular face 37.

Deflection of portion 14 is effected by an advance (leftward movement as shown in FIG. 2) of the nut member 12 from the position wherein the deflectable portion engages outer frusto-conical portion 23 of cam surface 15. When the deflectable portion reaches the position of FIG. 3, it is desirable to indicate this "hit home" condition thereby advising the operator to discontinue further advance of the nut member. Conventionally, such "hit home" indication is effected by providing a surface on the nut member positively engaging a co-operating surface on the body member to limit further advance of the nut member. As discussed above, however, such structure precludes satisfactory use of the fitting in effecting a plurality of reconnections where the tubing 11 is formed of a settable material such as copper. The instant invention comprehends the provision of a spacer 16 disposed between body member outer surface 25 and nut member inner surface 31 providing the desirable "hit home" indication notwithstanding a set in tubing 11 resulting from a previous connection. More specifically, spacer 16 comprises an annular member formed of a material having limited yieldability, one example of such a material being a plastic such as polyethylene. The axial length of spacer ring 16 is correlated with the slope of the cam surface 15, the spacing of cam surface 15 from outer body surface 25, and the spacing of the deflectable portion 14 from the plane of nut surface 31 so that when the surfaces 25 and 31 are brought together to abut opposite portions of the spacer ring 16 and compressed axially, the spacer yields a preselected amount which is less than that allowed by the limited yieldability of the spacer, and a limited radially inward deflection of the deflectable portion 14 results which is proper for effecting a sealing securing of the deflectable portion 14 to tubing 11 and to cam surface 15. When, subsequent to such a bringing together of surfaces 25 and 31, the surfaces are moved apart and again brought together, substantially the same axial compression of spacer ring 16 may be effected to provide a similar radially inward deflection of the deflectable portion 14 for effecting the sealing securing of the deflectable portion to tubing 11 and to cam surface 15 where the tubing has not been set as a result of the previously effected securing. Alternatively, where tubing 11 is formed of a settable material, spacer ring 16 may be additionally axially compressed up to the limit of its yieldability to provide such additional radially inward deflection of deflectable portion 14 proper for effecting the sealing securing of the deflectable portion to tubing 11 and to cam surface 15. I have found that, in practice, a substantial number of reconnections of the fitting to the settable tubing may be effected before the range of yieldability of such a spacer ring is reached, for example, with a polyethylene spacer ring at least four or five reconnections of copper tubing may be obtained.

The functioning of fitting 10 with settable tubing is illustrated in dotted lines in FIG. 3 showing such additional deflection of nut member portion 14 where the tubing has taken a set during the previous connection. As illustrated in FIG. 3 spacer 16 permits an additional axial compression within the limit of its deformability to provide the additional deflection of nut member portion 14. Illustratively, an additional axial movement of nut member 12 of approximately several thousandths of an inch has been found to be sufficient to provide the additional deflection of nut member portion 14 where tubing 11 is formed of a settable material such as copper. Spacer 16 may be arranged to have an axial compression of up to approximately 1/100 of an inch before reaching the limit of its yieldability so that at least five such reconnections of the fitting with such tubing may be effected.

In making up the connection, the end of tubing 11 is passed through bore 27 of the nut member and inserted into bore 17 of the body member until it engages the frusto-conical surface 20 of the body member bore. Nose portion 14 of the nut member is inserted into the body member bore and threaded portion 32 of the nut member is threaded into threaded portion 24 of the body member as by manual rotation of the nut member, until nose portion 14 engages frusto-conical portion 23 of the camming surface 15. Further advance of the nut member may now be effected by a forceful rotation of the nut member, as by a suitable tool (not shown) engaging surfaces 29 of the nut member. Assuming that the fitting is being connected to tubing 11 for the first time, the connection is completed when the nut member 12 reaches the full line position of FIG. 3. During movement of the nose portion 14 from the position of FIG. 2 to the position of FIG. 3, frangible connection 33 is broken. Thus, upon withdrawal of nut 12, as during a disconnection of the tubing 11 from body member 13, the nose portion 14 remains in place on tubing 11 while the remainder of the nut member moves retrogradedly over the tubing. When the threaded portion 32 of the nut member becomes disengaged from threaded portion 24 of the body member, the tubing 11 may be removed from bore 17 of the body member with nose portion 14 fixedly retained and the remainder of nut member 12 loosely retained on the tubing. Reconnection of the tubing 11 to body member 13 is effected as described above, with the reconnection being effected by a return of the nut member 12 to substantially the full line position of FIG. 3 during each of a substantial number of subsequent reconnections where the tubing 11 is formed of a non-setting material, and by successively more greatly advanced positions, one of which is illustrated in dotted lines in FIG. 3, where the tubing 11 is formed of a settable material. In either case, a substantial number of reconnections may be effected with tubing 11 with tubing having any one of a plurality of different resistances to setting. In each case, the "hit home" indication is effected by the cumulative resistance to advance of the nut member effected by the compression of the spacer and the constriction of the nose portion and the tubing as the sealing engagement of the nose portion is effected.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A fitting for use with tubing having any one of a plurality of different resistances to setting, comprising: a body having a bore provided with an annular cam surface narrowing axially inwardly, and an annular outer surface spaced axially outwardly from said cam surface and extending transversely to the bore; a nut connected to the body and having a bore communicating with the body bore, said nut having a deflectable inner end portion engaging said cam surface to be deflected radially inwardly thereby as a result of a moving together of the body and nut, and said nut further having a transverse annular surface confronting said outer surface of the body; and a ring disposed between said outer body surface and confronting nut surface formed of a resilient material having limited ready yieldability, the axial length of the ring being correlated with the slope of the cam surface, the spacing of the cam surface from said outer body surface, and the spacing of the deflectable nut portion from the plane of said confronting nut surface so that when said body outer surface and confronting nut surface are brought together to abut opposite portions of the ring and compress axially the ring a preselected small amount which is less than one-half that allowed by the limited yieldability of said ring, a limited inward deflection of the deflectable portion results which is proper for effecting a sealing securing of the deflectable portion to the tubing and to the cam surface, and when, subsequent to such a bringing together of the body outer surface and confronting nut surface, said body outer surface and confronting nut surface are moved apart and again brought together, substantially the same axial compression of the ring may be effected to provide such inward deflection of the deflectable portion for effecting the sealing securing of the deflectable portion to the tubing and to the cam surface where the tubing has not been set as a result of the previously effected securing, and additional axial compression of the ring may be effected up to the limit of its yieldability to provide such additional inward deflection of the deflectable portion proper for effecting a sealing securing of the deflectable portion to the tubing and to the cam surface where the tubing has taken a set as a result of the previously effected securing.

2. A fitting for use with tubing having any one of a plurality of different resistances to setting, comprising: a body having a bore provided with an annular cam surface narrowing axially inwardly, and an outer surface spaced axially outwardly from said cam surface and extending transversely to the bore; a nut connected to the body and having a bore communicating with the body bore, a deflectable inner end portion engaging said cam surface to be deflected inwardly thereby as a result of a moving together of the body and nut, and a surface confronting said outer surface of the body; and a spacer disposed between said outer body surface and confronting nut surface formed of a resilient plastic material having limited ready yieldability, the extent of the spacer parallel to the body bore axis being correlated with the slope of the cam surface, the spacing of the cam surface from said outer body surface, and the spacing of the deflectable nut portion from the plane of said confronting nut surface so that when said body outer surface and confronting nut surface are brought together to abut opposite portions of the spacer and compress the spacer a preselected small amount which is less than one-half that allowed by the limited yieldability of the spacer, a limited inward deflection of the deflectable portion results which is proper for effecting a sealing securing of the deflectable portion to the tubing and to the cam surface, and when, subsequent to such a bring together of the body outer surface and confronting nut surface, said body outer surface and confronting nut surface are moved apart and again brought together, substantially the same compression of the spacer may be effected to provide such inward deflection of the deflectable portion for effecting the sealing securing of the deflectable portion to the tubing and to the cam surface where the tubing has not been set as a result of the previously effected securing, and additional compression of the spacer may be effected up to the limit of its yieldability to provide such additional inward deflection of the deflectable portion proper for effecting a sealing securing of the deflectable portion to the tubing and to the cam surface where the tubing has taken a set as a result of the previously effected securing.

3. A fitting for use with tubing having any one of a plurality of different resistances to setting, comprising: a body having a bore provided with an annular cam surface narrowing axially inwardly, and an outer surface spaced axially outwardly from said cam surface and extending transversely to the bore; a nut connected to the body and having a bore communicating with the body bore, a deflectable inner end portion engaging said cam surface to be deflected inwardly thereby as a result of a moving together of the body and nut, and a surface confronting said outer surface of the body; and a spacer disposed between said outer body surface and confronting nut surface formed of a resilient material having limited ready yieldability, the extent of the spacer parallel to the body bore axis being correlated with the slope of the cam surface, the spacing of the cam surface from said outer body surface, and the spacing of the deflectable nut portion from the plane of said confronting nut surface so that when said body outer surface and confronting nut surface are brought together to abut opposite portions of the spacer and compress the spacer a preselected small amount which is less than one-half that allowed by the limited yieldability of the spacer, a limited inward deflection of the deflectable portion results which is proper for effecting a sealing securing of the deflectable portion to the tubing and to the cam surface, and when, subsequent to such a bringing together of the body outer surface and confronting nut surface, said body outer surface and confronting nut surface are moved apart and again brought together, substantially the same compression of the spacer may be effected to provide such inward deflection of the deflectable portion for effecting the sealing securing of the deflectable portion to the tubing and to the cam surface where the tubing has not been set as a result of the previously effected securing, and additional compression of the spacer may be effected up to the limit of its yieldability to provide such additional inward deflection of the deflectable portion proper for effecting a sealing securing of the deflectable portion to the tubing and to the cam surface where the tubing has taken a set as a result of the previously effected securing.

4. The fitting of claim 3 wherein the spacer is formed of polyethylene.

5. The fitting of claim 3 wherein the deflectable portion is frangibly joined to the nut to be retained on the tubing subsequent to the first securing.

6. The fitting of claim 3 wherein the cam surface includes an outer frusto-conical portion and an inner frusto-conical portion having a greater angle to the axis thereof than said outer frusto-conical portion.

References Cited in the file of this patent

UNITED STATES PATENTS

| | | |
|---|---|---|
| 1,894,700 | Parker | Jan. 17, 1933 |
| 2,294,160 | Crane | Aug. 25, 1942 |
| 2,330,864 | Bruno | Oct. 5, 1943 |
| 2,335,040 | Bruno | Nov. 23, 1943 |
| 2,399,275 | Wenk | Apr. 30, 1946 |
| 2,455,667 | Franck | Dec. 7, 1948 |
| 2,497,274 | Richardson | Feb. 14, 1950 |
| 2,511,134 | Stranberg | June 13, 1950 |
| 2,571,560 | Gall | Oct. 16, 1951 |
| 2,695,796 | Woodling | Nov. 30, 1954 |
| 2,828,978 | Wirzburger | Apr. 1, 1958 |

FOREIGN PATENTS

| | | |
|---|---|---|
| 458,408 | Canada | July 26, 1949 |
| 1,078,733 | France | May 12, 1954 |